United States Patent [19]

Li et al.

[11] Patent Number: 5,265,246
[45] Date of Patent: Nov. 23, 1993

[54] GRAPHIC DEFINITION OF RANGE IN THE SELECTION OF DATA FROM A DATABASE FIELD

[75] Inventors: Shih-Gong Li; Bruce A. Tate, both of Austin, Tex.

[73] Assignee: International Business Machines Corporation, Armonk, N.Y.

[21] Appl. No.: 983,095

[22] Filed: Nov. 24, 1992

Related U.S. Application Data

[63] Continuation of Ser. No. 624,826, Dec. 10, 1990, abandoned.

[51] Int. Cl.$^5$ ............................................. G06F 15/403
[52] U.S. Cl. ............................. 395/600; 364/DIG. 1; 364/283.4; 364/237.3
[58] Field of Search ............... 364/DIG. 1 MS File, 364/DIG. 2 MS File; 395/140, 158, 600

[56] References Cited

U.S. PATENT DOCUMENTS

| | | | |
|---|---|---|---|
| 4,782,463 | 11/1988 | Sanders et al. | 364/DIG. 2 |
| 4,805,099 | 2/1989 | Huber | 364/DIG. 1 |
| 4,831,556 | 5/1989 | Oono . | |
| 4,905,163 | 2/1990 | Garber et al. . | |
| 5,088,052 | 2/1992 | Spielman et al. | 395/158 |

OTHER PUBLICATIONS

*IconicBrowser: An Iconic Retrieval System for Object-Oriented Databases*, 1989 IEEE Workshop on Visual Languages 4, Oct. 1989, Rome, IT, pp. 130–137, Tsuda K. et al.
IBM Technical Disclosure Bulletin, vol. 33, No. 3B, Aug. 1990, pp. 31–32, *Min–Max Slider*.
"IBM Operating System/2 Extended Edition Version 1.3", pp. 13-25–13-27.

*Primary Examiner*—Thomas M. Heckler
*Attorney, Agent, or Firm*—Casimer K. Salys

[57] ABSTRACT

A system, program and method for interfacing a human user to an indexed field of data from a database. The invention is particularly directed to the definition of a BETWEEN argument in a database query. A ruler is linearly related to the data in the field. Individually movable tacks are positioned along the ruler to define the boundaries of a range in direct correspondence to a range of data from within the field. Dialog blocks are provided for alphanumeric entry and readout of tack location data. In a preferred form, the ruler also provides control blocks which are individually related to the tacks and are suitable to increment or decrement the tack values as relates to the data in the field.

14 Claims, 9 Drawing Sheets

GRAPHIC DEFINITION OF RANGE IN THE SELECTION OF DATA FROM A DATABASE FIELD

This is a continuation of application Ser. No. 07/624,826 filed Dec. 10, 1990, now abandoned.

BACKGROUND OF THE INVENTION

The present invention relates in general to an interface between a human user and a computerized database system. More particularly the invention is directed to a system and method for graphically specifying data ranges used in defining a query to a database.

The entry and retrieval of data via interactive terminals is now a common practice. Large volumes of data stored on magnetic disks, optical disks, or other contemporary non-volatile storage media, are routinely accessed locally or through networks using terminals or functional equivalent workstations or personal computers. Such prevalent uses of databases has created an environment in which the level of data processing skill processed by an average user is disproportionately low in relation to the complexity of the hardware and software functions available to interact with the database. This is particularly true for relational databases, where the information content is significant yet the query mechanisms for defining the desired information involve esoteric data definitions and groupings. Though the human interface technology for accessing relational database information has progressed beyond the use of structured query language (SQL) statements to the use of query by example (QBE) techniques, there remains a need for further simplification of the interaction.

The use of bars with slide blocks or related markers to select values for parameters such as color, shading or quantity in software programs is common practice. For example, this technique is used in the OS/2 (trademark of IBM Corporation) Extended Edition operating system program, available from IBM Corporation, to define screen colors for a workstation. As such, the approach represents nothing more than a graphically simulated analog value selector. U.S. Pat. No. 4,905.163 teaches in one aspect the relating of bar graph depicted input and output data through specified mathematical formulas. The underlying concept relates to having information provided both in numerical and graphical form.

A representative commercially available relational database is included in the aforementioned OS/2 Extended Edition operating system program available from IBM Corporation as particularly suited for use in a PS/2 (trademark of IBM Corporation) workstation. A representative configuration for such workstation includes a graphics display, a keyboard, a mouse and cabinet resident hard disk drive. A typical workstation would also include communication and networking cards suitable to access extended databases in networks or on host computers.

SUMMARY OF THE INVENTION

The present invention provides an intuitive yet comprehensive system and method for a human user to define the range of a query directed to a relational database. More particularly, the invention involves the use of graphic representations, combined with alphanumerics as required, to establish the range of an SQL "BETWEEN" clause in a query directed to a relational database.

According to a preferred practice of the invention, the BETWEEN clause in a query is graphically defined through the use of a dialog window. The window includes a ruler to represent the whole of the data range subject to selection. Multiple graphically depicted tacks are positioned along the ruler as relative bounds for the values to be selected from the grouping of data. The data values selected conceptually lie between the boundaries defined by the tacks. Thus, the graphical representation of a ruler with a segment defined by tacks is used to represent a BETWEEN clause applicable to a grouping of data. Such data is preferably a row from within the relational database.

A preferred arrangement of the ruler includes graphically depicted incrementing and decrementing mechanisms at opposite ends of the ruler or bar structure, designed to selectively translate the respectively related tacks along the ruler. Another beneficial feature is the presence of a pair of dialog boxes, which boxes relate to the tack positions and as such provide in alphanumeric format the actual data corresponding to the locations of the tacks.

Permutated uses of the tacks in relation to the ruler provide the human user with graphical mechanisms to define relationships such as equality greater than, less than, and even exclusions of range. Furthermore, the invention is suitable to define either inclusion or exclusion of the end points established by the tacks.

These and other features of the invention will be understood and appreciated with greater specificity upon considering the detailed description which follows.

DESCRIPTION OF THE PREFERRED EMBODIMENT

Figure 1:
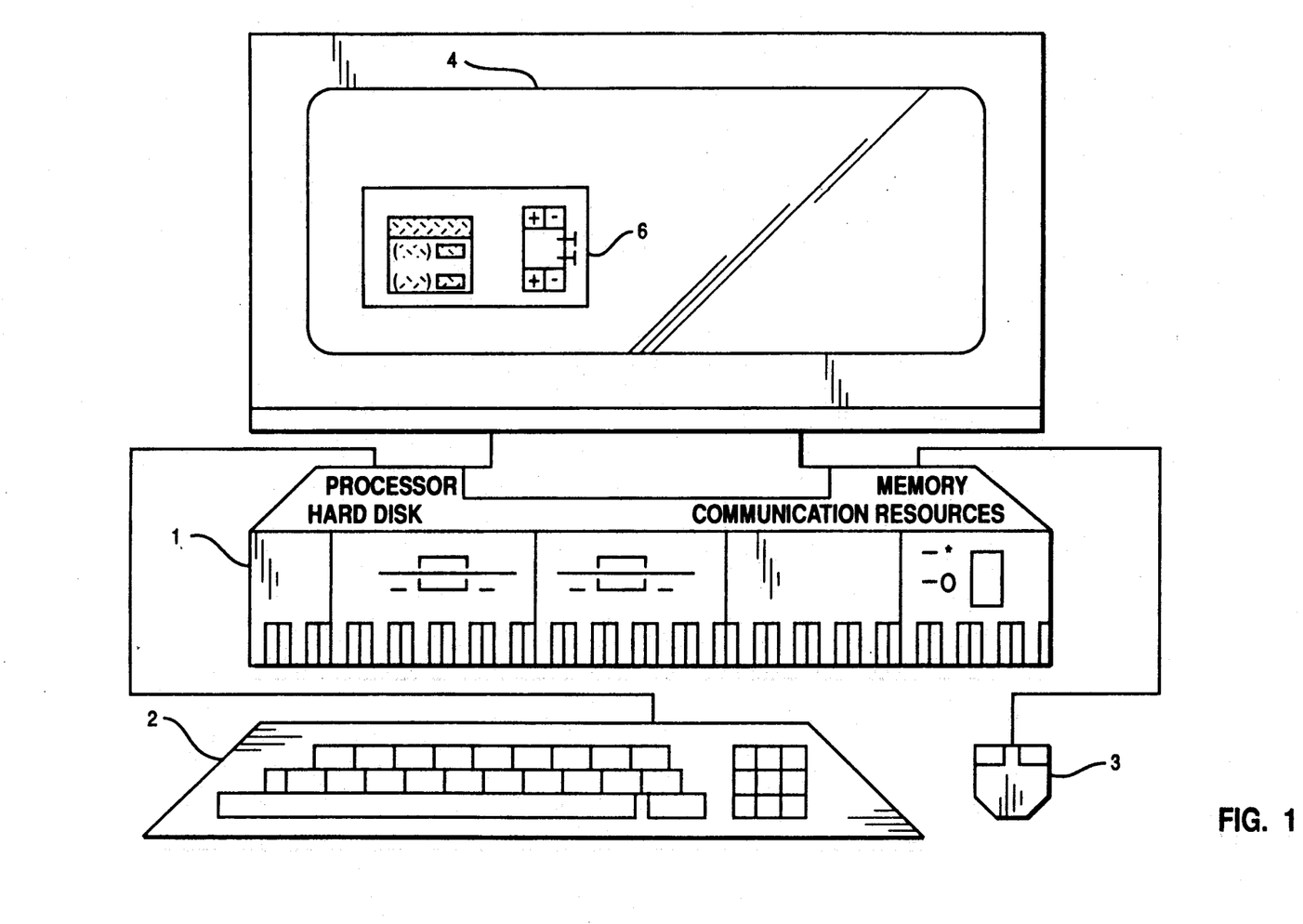
FIG. 1 is a schematic block diagram of a workstation using a graphics media to select a range of query data.

The present invention is preferably practiced in the context of the system generally depicted in FIG. 1. As such, the preferred system includes a workstation 1 (processor, memory, hard disk, communication resources) having attached thereto a keyboard 2 and mouse 3. A graphics video display 4 is also shown. Preferably, the hardware is the aforementioned PS/2 workstation and is responsive to the noted OS/2 Extended Edition operating system program.

The invention focuses on a system, program and method by which a user friendly and intuitive interface can be manipulated to define a query for a relational database, such as the database in the OS/2 operating system, by a human user of moderate data processing skill. In the example set forth hereinafter, the objective is to selectively extract data which satisfies specified conditions. The invention teaches a way to specify a BETWEEN relationship in fields of relational data while providing the user with intuitive feedback as to how the specified range relates to the overall range of the field. Window 6 in display 4 illustrates a representative working environment for the user.

Figure 2:
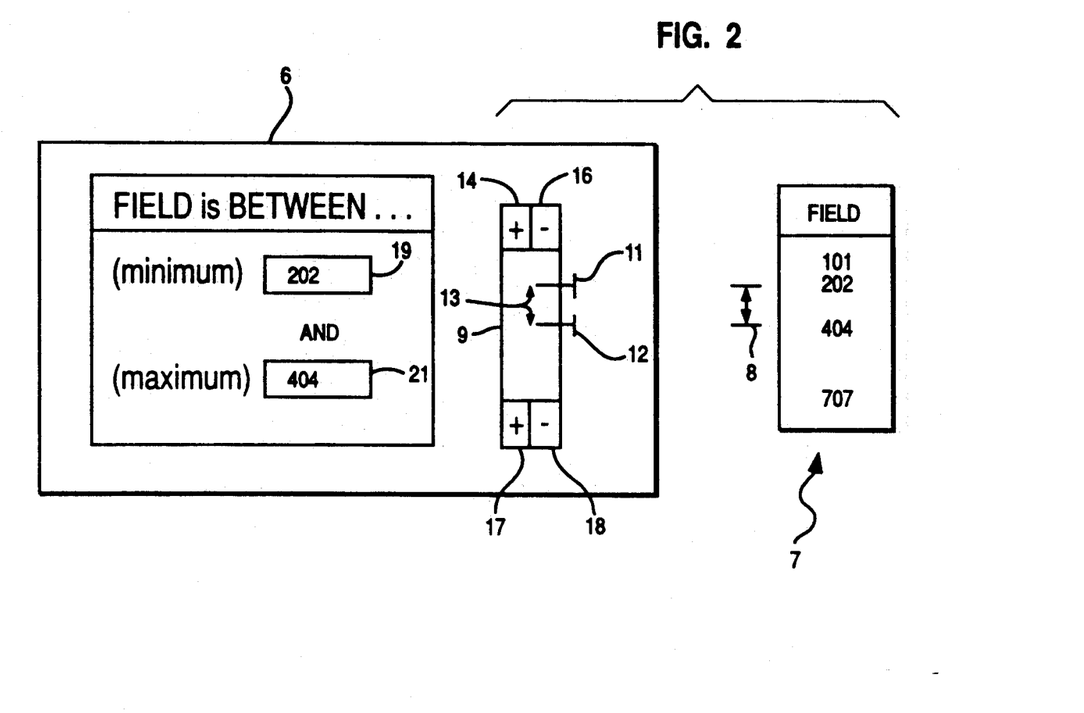
FIGS. 2, 3 and 4 are schematics of example windows and related data fields.

Window 6 is shown in magnified form in FIG. 2. A field of information 7 as might reside in the relational database is shown juxtaposed, including conceptually related range boundary markers 8. The data in field 7 is indexed to ensure ascending, or descending if desired, hierarchy thereof.

According to the preferred practice of the invention as first depicted in FIG. 2, window 6 includes a rectangular shaped bar or ruler 9 to generally represent the linear distribution of the data 7. Referenced to the ruler 9 are a pair of boundary marking tacks 11 and 12, respectively designating according to the preferred practice a minimum and maximum range therebetween, generally 13, within the expanse of ruler 9. Since the length of ruler 9 is a linear representation of the data in field 7, range 13 is a linear subdivision of the values within the range.

If desired the linearity between range 13, and the corresponding range 8 of values within the field of data 7, can be eliminated and replaced by a measure based upon the position of the data element within the count of data elements in field 7. In such embodiment the data number 404 would correspond to the ruler region lying between 50% and 75% of its expanse.

The embodiment depicted in FIG. 2 also includes at each end of ruler 9 a set of blocks 14. 16. 17 and 18, individually identified by "+" and "−" symbols. The blocks are used to increment or decrement their associated tacks in varying the range 13. Preferably, the changes would occur in step increments of existing data. Thus, the selection of "+" block 14 would incrementally move minimum value tack 11 from its present value, such as 202 to the next greater value, 404. Selection of block 16, on the other hand, would move tack 11 in the opposite direction. Similarly, maximum value tack 12 is responsive to increasing or decreasing changes of range initiated by respective selections of blocks 17 or 18.

The preferred arrangement of the invention also provides for the direct "dragging" of tacks 11 and 12 up or down the length of the ruler by selection using mouse 3 (FIG. 1).

The use of rulers and tacks to select ranges within a field of a relational database is particularly useful in specifying a search having the functional equivalent of SQL BETWEEN clauses in selecting data from a designated field. The graphic representation provides a user friendly and intuitive implementation by which to select the argument range.

The embodiment depicted in FIG. 2 also provides a pair of dialog boxes. 19 and 21, which respectively show the range minimum and maximum data as resides in the grouping of field 7. A preferred arrangement of the invention allows the user to select a range by entering alphanumeric data into such dialog windows 19 and 21 and thereupon graphically ascertain from the locations of tacks 11 and 12 the relative expanse of the field encompassed by the alphanumeric data so entered. In this way the user is given maximum flexibility, in that the range information can be entered into the dialog box and visually appreciated from the ruler tacks, or controlled by movement of the ruler tacks and alphanumerically quantified by values showing in the dialog windows.

Figure 3:
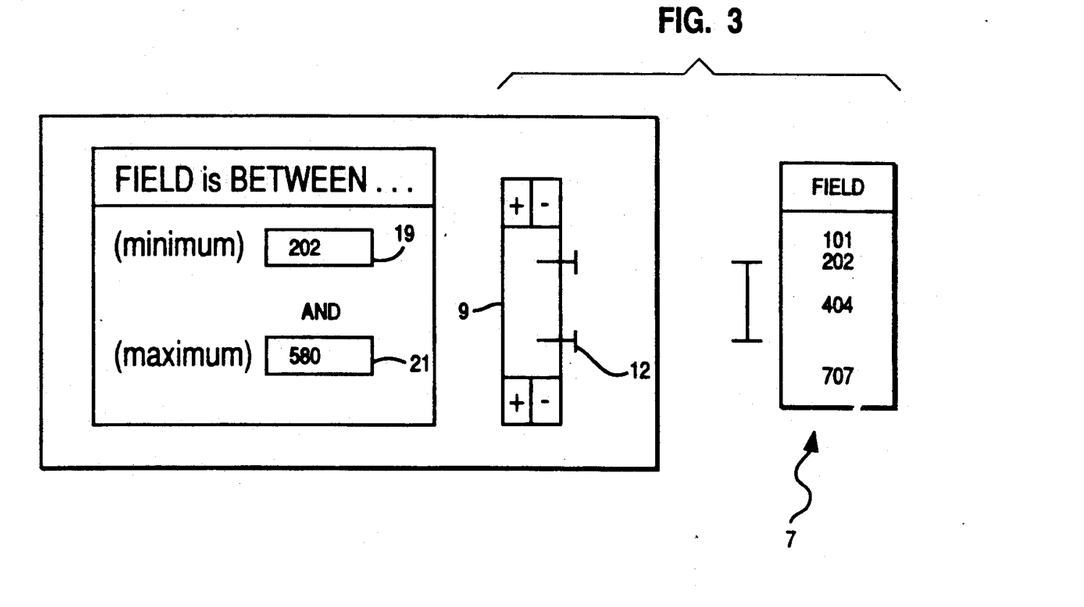

FIG. 3 illustrates that the data, in this case numerical values, represented by the tacks, and particularly tack 12, does not necessarily have to match a value in field 7. In this case, maximum tack 12 has been located at the relative value of 580 in a ruler range extending between 101 and 707. Thus the user of the graphical interface can define the BETWEEN argument without knowing the actual values of the data in the field, merely by dragging the tacks to relative percentage locations along the ruler. A preferred arrangement allows the tacks to "snap" to the nearest value upon release from a dragging operation, a technique particularly useful with alphabetic entry fields. The range boundaries defined by such location of the tacks appear in dialog blocks 19 and 21. It is also possible, as described earlier, to enter alphanumeric values into dialog blocks 19 and 21, and then observe the effects upon the minimum and maximum tack positions.

Figure 4:
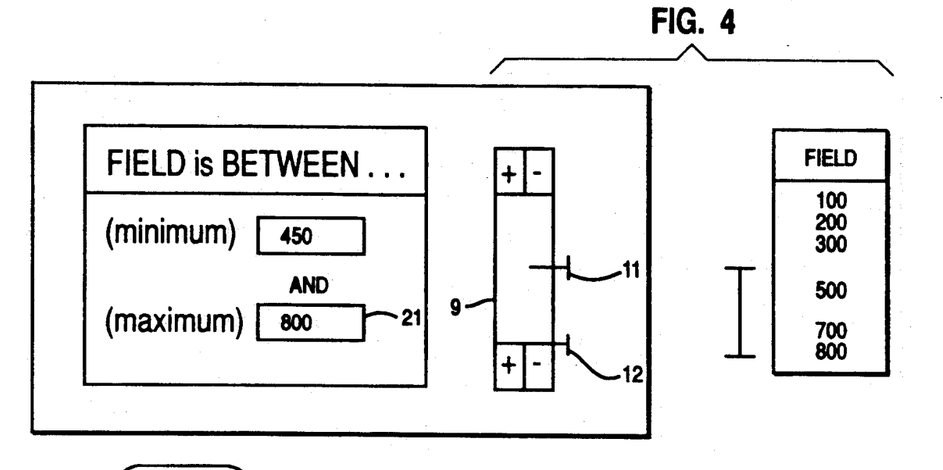

FIG. 4 illustrates another use of rulers and tacks according to the present invention. In this case, maximum tack 12 is situated at the end of the ruler, and the maximum value so designated appears in dialog block 21. If minimum tack 11 is placed at the middle of ruler 9, not only does the value appear in dialog block 19, but the BETWEEN argument prescribes a selection of the upper half of the data in the field without any prior knowledge of the data values.

Figure 5A:
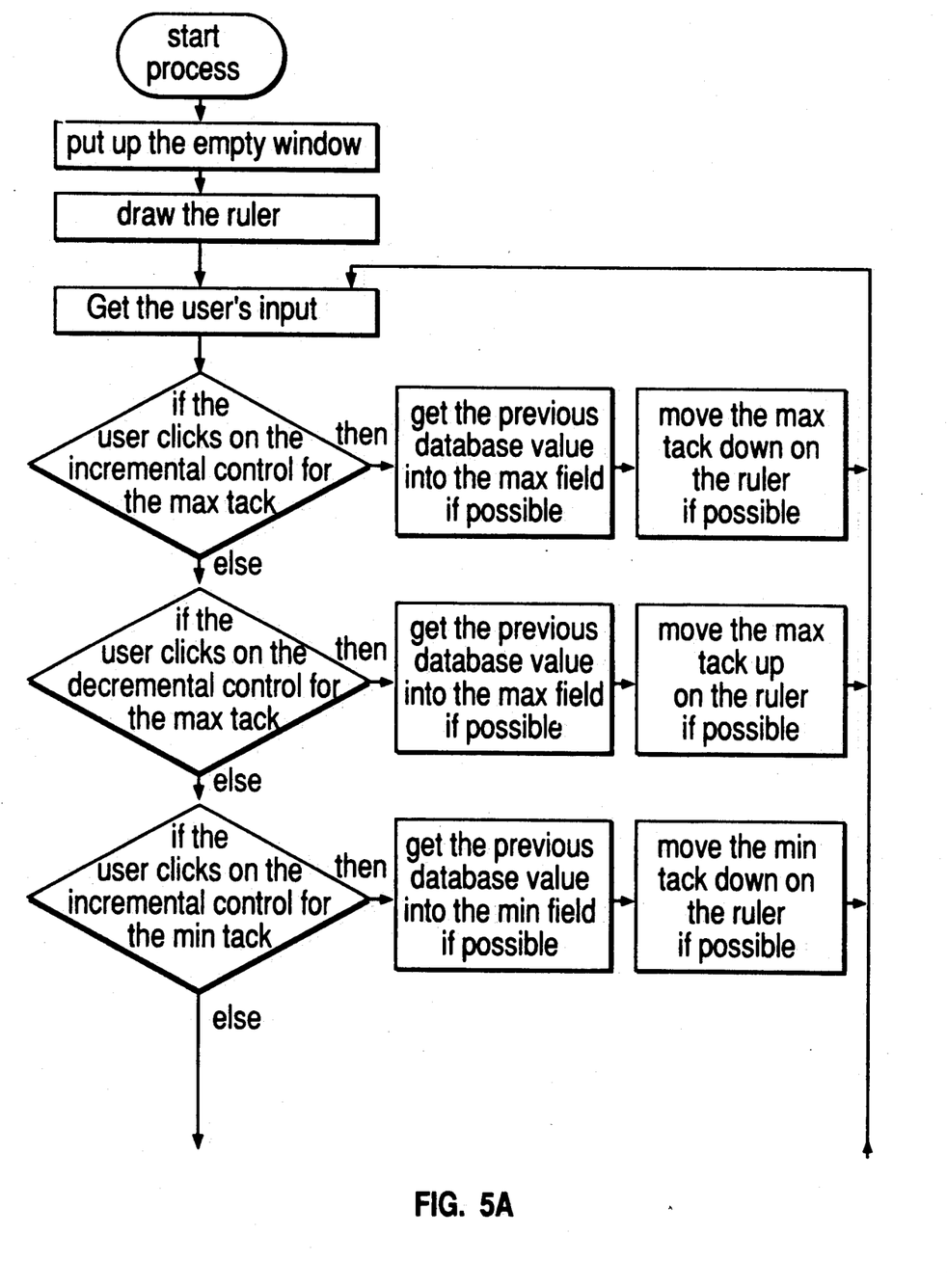
FIGS. 5A, 5B, and 6A-6E are schematic flow diagrams of steps relating to the practice of the invention.
Figure 5B:
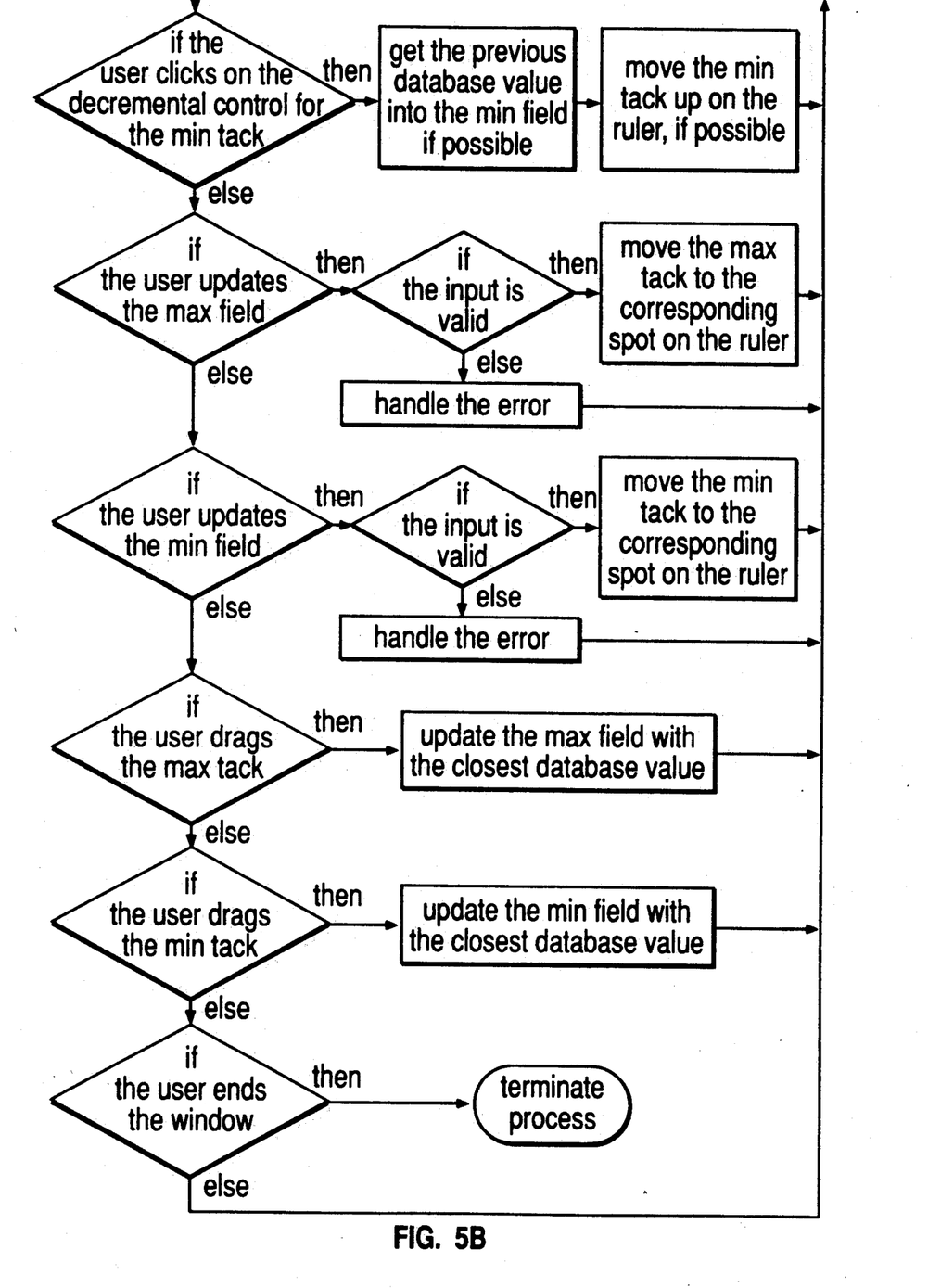
Figure 6A:
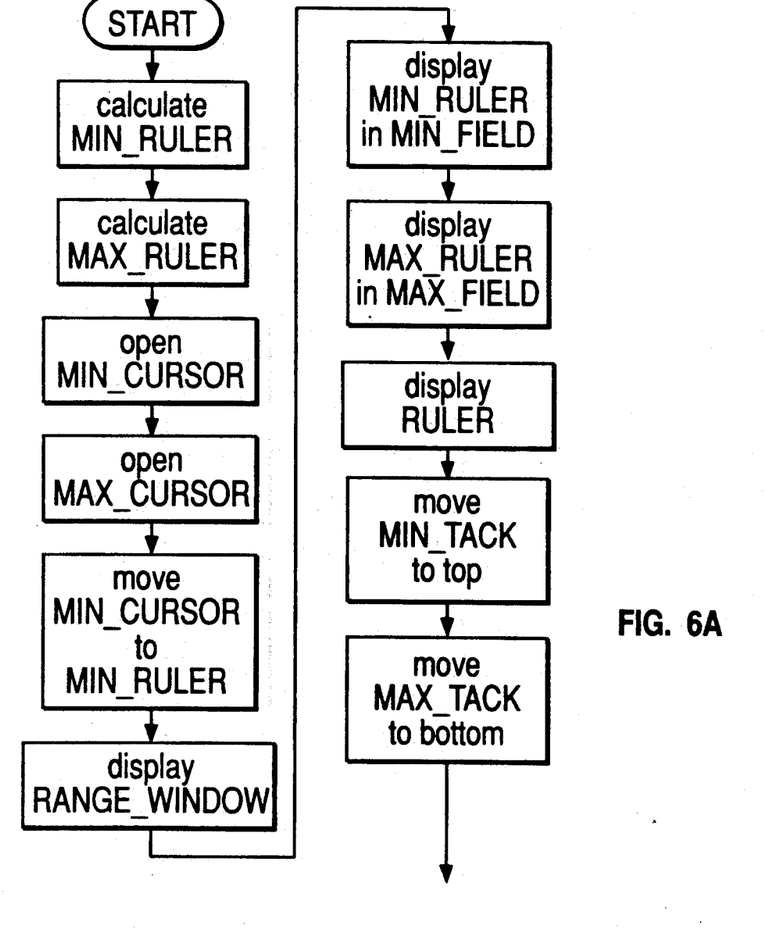
Figure 6B:
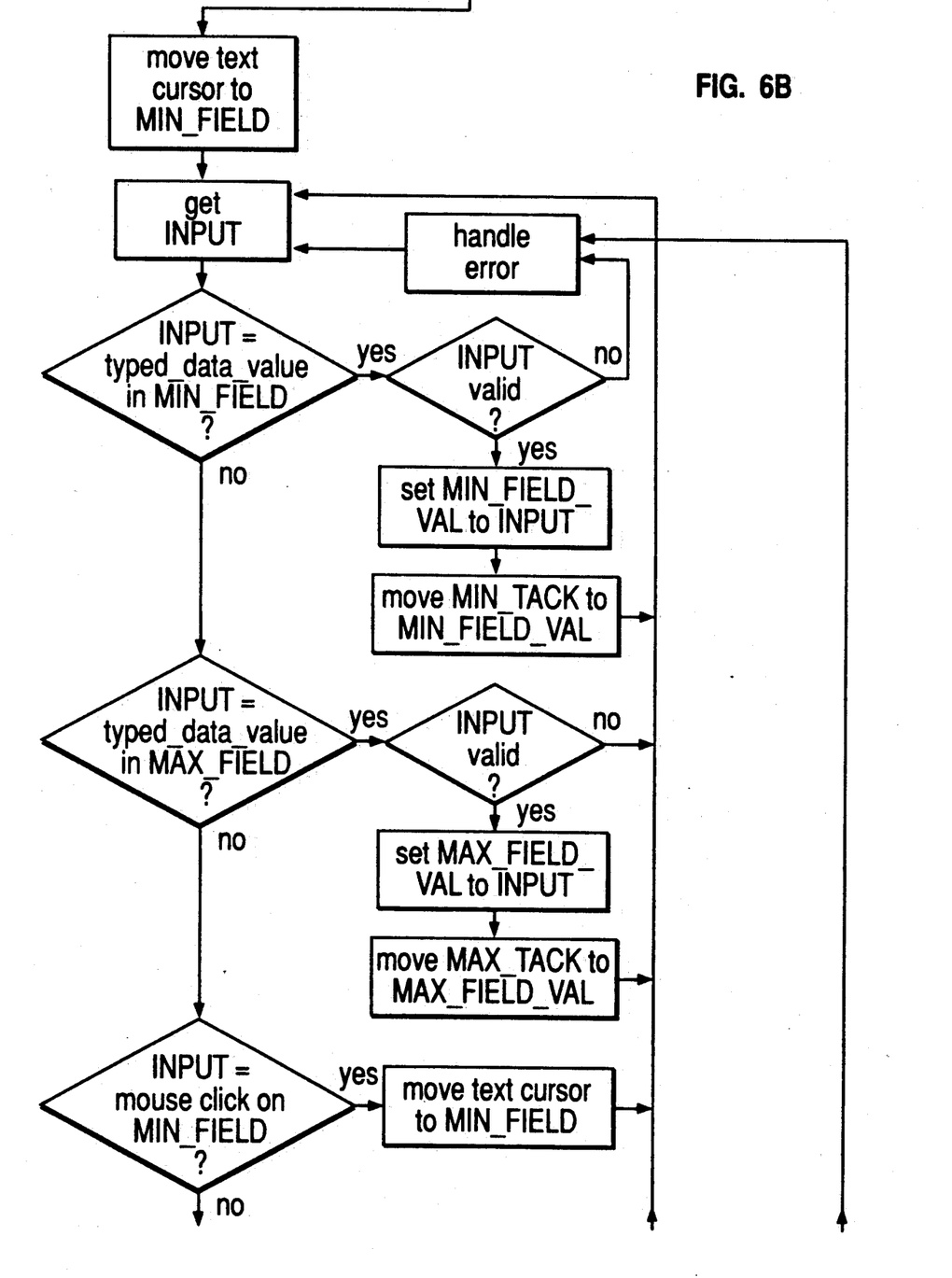
Figure 6C:
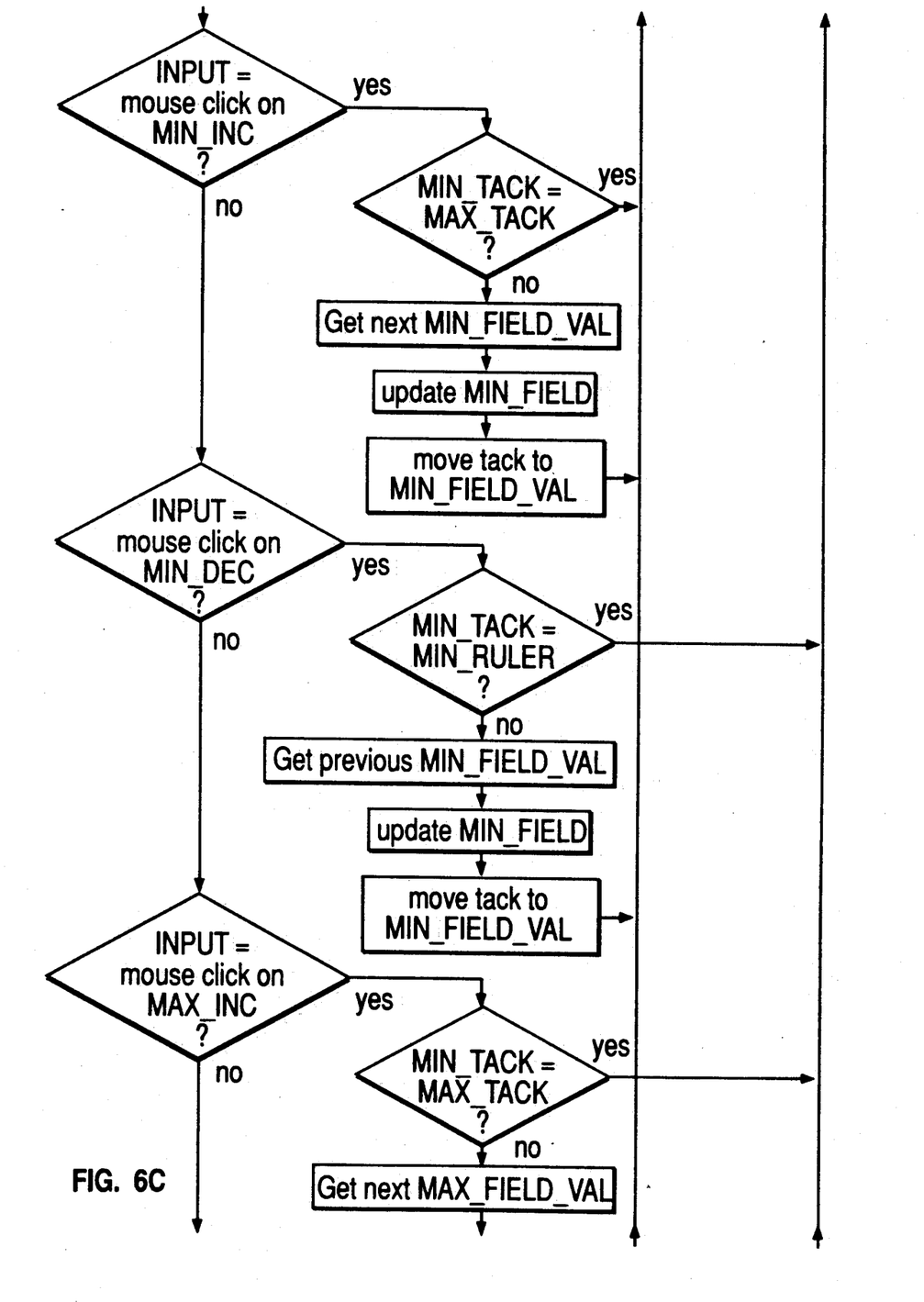
Figure 6D:
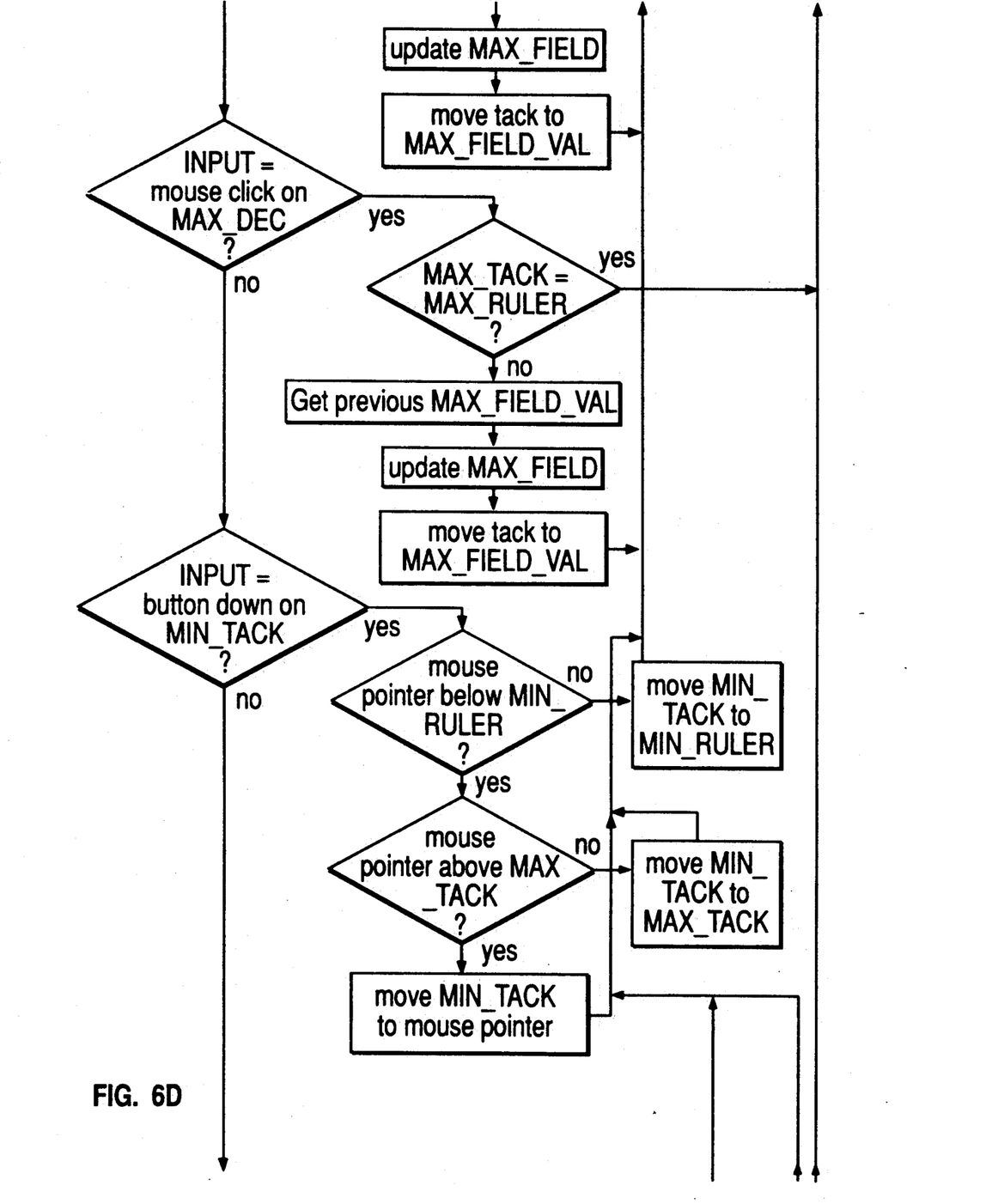
Figure 6E:
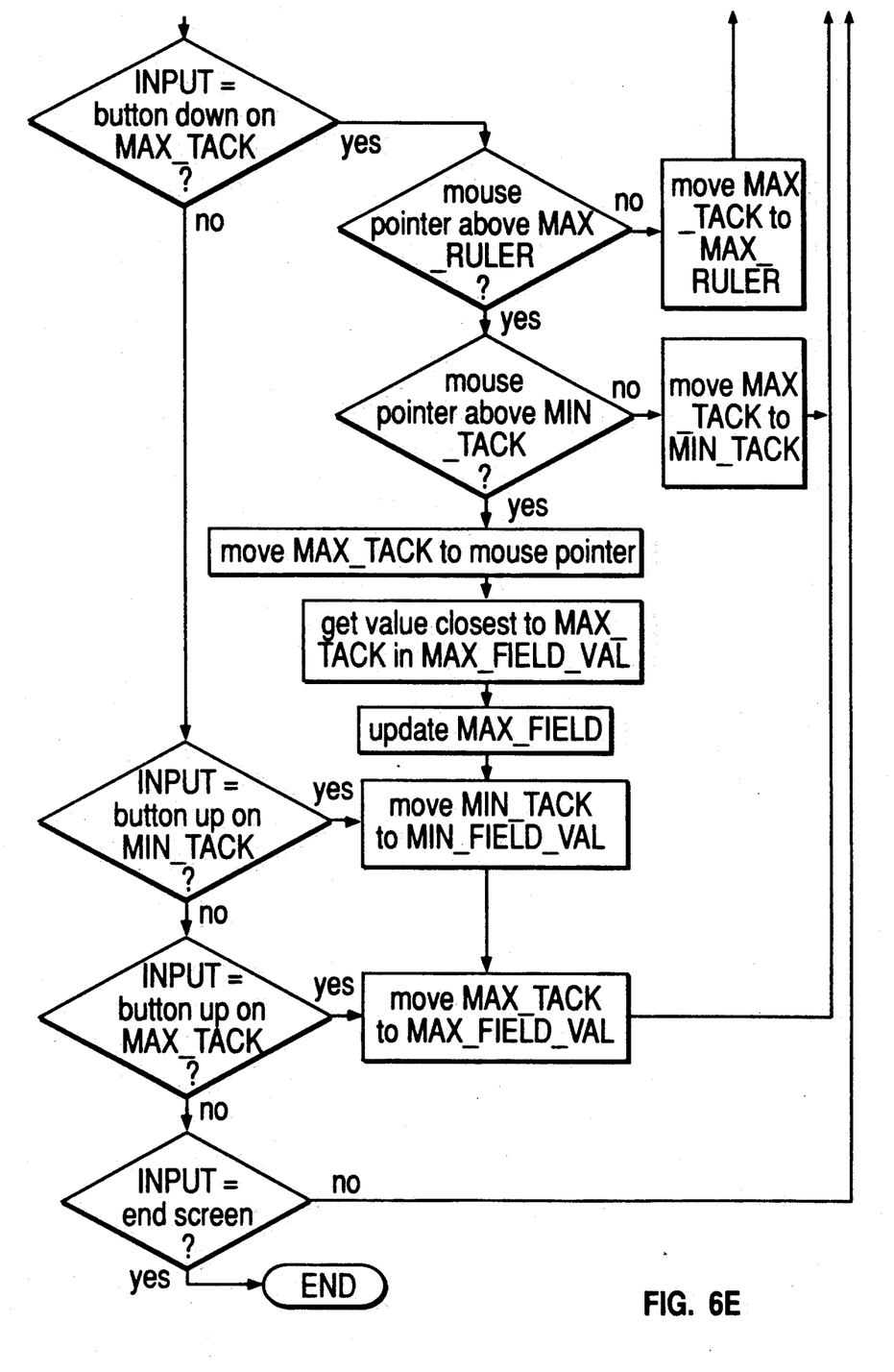

FIGS. 5A and 5B depict by flow diagram a behavioral level process for using the invention to define a BETWEEN argument for a relational database search. The succession of FIGS. 6A–6E particularize the procedures as relates to the use of a cursor and mouse to interact with the ruler, the tacks, and dialog boxes in the course of a user establishing or modifying a BETWEEN argument for a relational database search.

Pseudo code, from which source code can be derived, for controlling the interaction between the user and the ruler, tacks and dialog blocks in the window is set forth below. The code follows the operations depicted by flow diagrams in FIGS. 6A–6E.

The '<attribute> CLOSEST to <value>' operator returns the data base row whose specified <attribute> value is closest to the specified <value>. The '<attribute>' parameter may be omitted in cases where the desired value is clear.

The 'MOVE CURSOR TO <attribute> VALUE <value>' operator is used to move an open cursor to a database row whose <attribute> value is equal to the specified <value>.

```
input parameters:

TABLE:      name of table on which range will be
                defined.
    ATTRIBUTE:  name of database column on which
                range will be defined.
```

```
RANGE_WINDOW:   range window specification,
                containing
    MIN_FIELD:  minimum field in the range window
    MAX_FIELD:  maximum field in the range window RULER:      ruler specification containing
       MIN_TACK:   minimum tack specification
       MAX_TACK:   maximum tack specification
       MIN_INC:    minimum incremental control
       MAX_INC:    maximum incremental control
       MIN_DEC:    minimum decremental control
       MAX_DEC:    maximum decremental control declare MIN_FIELD_VAL,
        MAX_FIELD_VAL,
        MIN_RULER,
        MAX_RULER:      ATTRIBUTE_TYPE
        MIN_CURSOR,
        MAX_CURSOR:     CURSOR TO QUERY DEFINED BELOW begin
    set MIN_FIELD_VAL
        and
        MIN_RULER       to      the minimum value of
                                ATTRIBUTE
    set MAX_FIELD_VAL
        and
        MAX_RULER       to      the maximum value of
                                ATTRIBUTE
    open MIN_CURSOR,
        MAX_CURSOR:     'SELECT         // cursors are
                        <ATTRIBUTE>     // scrollable in
                        FROM <TABLE>    // both directions
                        ORDER BY        // and movable
                        <ATTRIBUTE>
                        REMOVE
                        DUPLICATES' move    the MIN_CURSOR          to    MIN_RULER
```

```
move       the MAX_CURSOR         to    MAX_RULER display    the  RANGE_WINDOW display    the  MIN_FIELD_VAL   in    MIN_FIELD
display    the  MAX_FIELD_VAL   in    MAX_FIELD display    the  RULER move       the  MIN_TACK        to top of ruler move       the  MAX_TACK        to bottom of ruler move       the  screen cursor   to MIN_FIELD set             INPUT           to NULL while the INPUT is not END_SCREEN get       the  user's input  into INPUT
   case INPUT of typed_minfield_value:  if MINFIELD_VALID then
                                get the
                                   MIN_FIELD_VAL
                                   from MIN_FIELD
                                move the MIN_TACK
                                   to   TACK_POS
                                   (MIN_FIELD_VAL)
                             else
                                handle_error
                             endif typed_maxfield_value:  if MAXFIELD_VALID then
                                get the
                                   MAX_FIELD_VAL
                                   from MAX_FIELD
                                move the MAX_TACK
```

```
                              to TACK_POS
                              (MAX_FIELD_VAL)
                           else
                              handle_error
                           endif clicked_on_min_field:   move the screen cursor
                        to MIN_FIELD clicked_on_max_field:   move the screen cursor
                        to MAX_FIELD clicked_on_min_inc:     if MAX_FIELD_VAL >
                        MIN_FIELD_VAL
                           fetch next MIN_CURSOR
                           set MIN_FIELD_VAL to
                              MIN_CURSOR value
                           display MIN_FIELD_VAL
                              in MIN_FIELD
                           move the MIN_TACK
                              to TACK_POS
                              (MIN_FIELD_VAL)
                        else
                           handle_error
                        endif clicked_on_min_dec:     if MIN_FIELD_VAL >
                        MIN_RULER
                           fetch previous
                              MIN_CURSOR
                           set MIN_FIELD_VAL to
                              MIN_CURSOR value
                           display MIN_FIELD_VAL
                              in MIN_FIELD
                           move the MIN_TACK
                              to TACK_POS
                              (MIN_FIELD_VAL)
                        else
```

```
                            handle_error
                        endif
clicked_on_max_inc:     if MAX_FIELD_VAL <
                        MAX_RULER
                            fetch next MAX_CURSOR
                            set MAX_FIELD_VAL to
                                MAX_CURSOR value
                            display MAX_FIELD_VAL
                                in MAX_FIELD
                            move the MAX_TACK
                                to TACK_POS
                                (MAX_FIELD_VAL)
                        else
                            handle_error
                        endif clicked_on_max_dec:     if MAX_FIELD_VAL >
                        MIN_FIELD_VAL
                            fetch previous
                                MAX_CURSOR
                            set MAX_FIELD_VAL to
                                MAX_CURSOR value
                            display  MAX_FIELD_VAL
                                in MAX_FIELD
                            move the MAX_TACK
                                to TACK_POS
                                (MAX_FIELD_VAL)
                        else
                            handle_error
                        endif button_down_on_min_tack:
                        if mouse_pointer is
                        above MIN_RULER
                            move MIN_CURSOR to
                                MIN_RULER
                            move MIN_TACK to
                                TACK_POS (MIN_RULER)
```

```
            else
              if mouse_pointer is
              below POS(MAX_TACK)
                move MIN_CURSOR to
                MAX_FIELD_VAL
                move MIN_TACK to
                POS(MAX_TACK)
              else
                move MIN_CURSOR to
                  value closest to
                  TACK_VALUE(POS
                  (mouse_pointer))
                move the MIN_TACK
                  to
                  POS
                  (mouse_pointer)
            endif
            set    MIN_FIELD_VAL to
                   MIN_CURSOR
            display MIN_FIELD_VAL in
                    MIN_FIELD button_release_min_tack:
            move the MIN_TACK
            to TACK_POS
            (MIN_FIELD_VAL)

button_down_on_max_tack:
            if mouse_pointer is
            above MAX_RULER
              move MAX_CURSOR to
                MAX_RULER
              move MAX_TACK to
                TACK_POS (MAX_RULER)
            else
              if mouse_pointer is
              above POS(MIN_TACK)
                move MAX_CURSOR to
                  MIN_FIELD_VAL
```

```
                    move MAX_TACK to
                        POS(MIN_TACK)
                else
                    move MAX_CURSOR
                        to value closest
                        to TACK_VALUE(POS
                        (mouse_pointer))
                    move the MAX_TACK
                        to POS
                        (mouse_pointer)
                endif
                set    MAX_FIELD_VAL to
                        MAX_CURSOR
                display MAX_FIELD_VAL in
                        MAX_FIELD button_release_max_tack:
                    move the MAX_TACK
                    to  TACK_POS
                    (MAX_FIELD_VAL)
    endwhile            // INPUT not END_SCREEN
End.

MINFIELD_VALID
   Input:  none
   Return: TRUE if the value specified in MIN_FIELD is
           valid; FALSE otherwise
Begin
   if (MINFIELD > MAXFIELD) or (MINFIELD syntak is
     invlaid)
        return (FALSE)
   else
     return (TRUE)
End;
MAXFIELD_VALID ()
   Input:  none
   Return: TRUE if the value specified in MAX_FIELD is
           valid; FALSE otherwise
```

```
Begin
   if  (MINFIELD > MAXFIELD) or (MINFIELD syntak is
     invlaid)
        return (FALSE)
   else
     return (TRUE)
End;

TACK_POS (TACK)
   Input:  a tack (MIN_TACK or MAX_TACK)
   Return: the position of the tack on the ruler TACK_VALUE
   Input:  a tack (MIN_TACK or MAX_TACK)
   Return: the database value relative to the tack Begin
                        // This procedure will calculate a
                        // logical position on the ruler
                        // with 0 being the top of the ruler
                        // and 1 being the top.
                        // For alphabetic fields, the top
                        // is 'a' and the bottom is 'z'.
                        // Changing the top and bottom
                        // to correspond to MIN_RULER and
                        // MAX_RULER is a trivial change
                        // to make if desired by subtracting
                        // the corresponding minimum value
                        // and multiplying the result by
                        // 1/the (maximum value - minimum
                        // value).
SIGNIFICANCE := 1
LOGICAL_POS := 0
if ATTRIBUTE is a character field
   for each character do
      SIGNIFICANCE := SIGNIFICANCE / 26
      LOGICAL_POS := LOGICAL_POS +
                  (ASCII(CHARACTER) -
```

```
               ASCII('A')) * SIGNIFICANCE
        endfor
    else
    endif
End;

POS

Input:  a tack or mouse pointer.
    Return: the position of the tack or mouse pointer.
```

The various features of the invention clearly provide a user friendly interface for defining a BETWEEN argument in structuring a query directed to a database. The system and method are particularly useful in that database information is selectively provided to the user in the course of defining a range, allows the user to enter data values and see the effects upon the range as relates to the data field, and provides the user with resources for incrementally moving through the field by data value increments. Thus, the field of the data for selecting a range is not presented in an overwhelming volume, yet is generically perceivable by the user in the course of specifying a range.

The invention incorporates features which make it particularly amenable to variations which allow more esoteric designation of data ranges within fields. Though the data fields are hierarchically ordered as indexed, they are not restricted to numerical values and, as such, can include alphabetically related data or alphanumeric combinational data. The invention also contemplates the possible use of overlapping tacks to designate equality, which equality can be specified by location on the ruler and subject to particularization in value using entry of data into the dialog blocks. The locations of tacks 11 and 12 in FIG. 4 also illustrate how the invention can be used to designate a less than status, in this case limited to a 50% range. The same approach can be used to designate a greater than status. It is further possible to individually characterize the tack icons to define an inclusion or an exclusion of the end points designated by the tacks. Additionally, the invention contemplates the use of distinctive tacks to define an excluded range such as might be represented by a query argument NOT BETWEEN.

Thus, the present invention provides an interface which allows a user to manipulate multiple tacks over a linearly displayed ruler, representing a field of data in a database, and provides interactive dialog blocks related to such tacks and field data, to allow a user intuitive interaction in specifying a BETWEEN clause query for a relational database.

Though the invention has been described and illustrated by way of specific embodiments, the systems, programs and methods should be understood to encompass the full scope of any structures and practices defined by the claims set forth hereinafter.

What is claimed is:

1. A system for interfacing a user to data stored in a data processing database, comprising:
   means for visually depicting on a graphical display a field of data from the database;
   user operable means for specifying a range from within the field of data; and
   means for depicting on the graphical display the specified range referenced to the means for depicting the field of data.

2. The system recited in claim 1, further comprising a graphical means for selectively varying the specified range.

3. The system recited in claim 2, wherein the user operable means for specifying includes alphanumeric entry means for specifying the range.

4. The system recited in claim 3, wherein the field is from a relational database.

5. The system recited in claim 4, wherein the means for visually depicting a field of data is a ruler bar, and the means for graphically depicting the specified range includes boundary markers referenced to the ruler bar.

6. The system recited in claim 5, wherein the user operable means for specifying a range selects a closest value when varied in response to a translation of a boundary marker.

7. The system recited in claim 6, wherein the means for selectively varying the specified range comprise means for incrementing and for decrementing.

8. The system recited in claim 2, wherein the field is from a relational database.

9. The system recited in claim 8, wherein the means for visually depicting a field of data is a ruler bar, and the means for graphically depicting the specified range includes boundary marker referenced to the ruler bar.

10. The system recited in claim 9, wherein the user operable means for specifying a range selects a closest value when varied in response to a translation of a boundary marker.

11. The system recited in claim 10, wherein the means for selectively varying the specified range comprises means for incrementing and for decrementing.

12. A method of interfacing a human user to data in a database, comprising the steps of:
   graphically depicting on a workstation display a field of data from the database;
   user specifying by graphically defined boundary markers a range within the field of data;
   relating the graphically defined boundary markers to data within the field of data; and
   user modifying the range by repositioning the boundary markers.

13. The method recited in claim 12, wherein the steps of user specifying creates a proportional relationship between the locations of the graphically depicted boundary markers and the field of data.

14. The method recited in claim 13 where the database is relational.

* * * * *